US010102607B2

United States Patent
Millet et al.

(10) Patent No.: US 10,102,607 B2
(45) Date of Patent: *Oct. 16, 2018

(54) METHOD FOR CHAINING MEDIA PROCESSING

(71) Applicant: Apple Inc., Cupertino, CA (US)

(72) Inventors: Timothy J. Millet, Mountain View, CA (US); Manu Gulati, Saratoga, CA (US); Arthur L. Spence, San Jose, CA (US); Gurjeet S. Saund, Saratoga, CA (US); Robert P. Esser, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,469

(22) Filed: Aug. 31, 2017

(65) Prior Publication Data

US 2017/0365034 A1 Dec. 21, 2017

Related U.S. Application Data

(63) Continuation of application No. 14/816,508, filed on Aug. 3, 2015, now Pat. No. 9,779,468.

(51) Int. Cl.
*G06T 1/20* (2006.01)
*G06F 9/52* (2006.01)
(Continued)

(52) U.S. Cl.
CPC ............ *G06T 1/20* (2013.01); *G06F 9/4893* (2013.01); *G06F 9/52* (2013.01); *G06T 1/60* (2013.01);
(Continued)

(58) Field of Classification Search
None
See application file for complete search history.

(56) References Cited

U.S. PATENT DOCUMENTS 6,760,846 B1 * 7/2004 Yoshida .................... G06F 1/26
713/300
8,601,169 B1   12/2013 Paragaonkar
(Continued)

FOREIGN PATENT DOCUMENTS

EP    2778840    9/2014

OTHER PUBLICATIONS

International Search Report and Written Opinion in application No. PCT/US2016/036688 dated Sep. 1, 2016.
(Continued)

*Primary Examiner* — Joni Richer
(74) *Attorney, Agent, or Firm* — Meyertons, Hood, Kivlin, Kowert & Goetzel, P.C.

(57) ABSTRACT

One embodiment may include media circuits, an application processor, a direct memory access circuit (DMA), and a media managing circuit. The application processor may issue media commands into a queue. The media managing circuit may retrieve a first media command, set the DMA to copy data associated with the first media command to the first media circuit, and send the first media command to the first media circuit. While the first media command is being executed, the media managing circuit may also retrieve a second media command, determine that the second media command utilizes data that is dependent on a completion of the first media command, and set the DMA to copy data from the first media circuit to the second media circuit. After the first media command has been completed, the media managing circuit may also send the second media command to the second media circuit.

20 Claims, 4 Drawing Sheets

(51) Int. Cl.
  *G06F 9/48* (2006.01)
  *G06T 1/60* (2006.01)
  *G09G 5/36* (2006.01)
  *G09G 5/00* (2006.01)

(52) U.S. Cl.
  CPC ............ *G09G 5/001* (2013.01); *G09G 5/363* (2013.01); *G09G 2360/08* (2013.01); *Y02B 60/144* (2013.01); *Y02D 10/24* (2018.01)

(56) References Cited

U.S. PATENT DOCUMENTS

| | | |
|---|---|---|
| 8,698,838 B1 | 4/2014 | Masterson |
| 8,966,229 B2 * | 2/2015 | Tran .................... G06F 9/30087 712/214 |
| 2007/0130382 A1 | 6/2007 | Moll |
| 2008/0303846 A1 * | 12/2008 | Brichter .................... G06F 3/14 345/661 |
| 2011/0210976 A1 * | 9/2011 | Diard ...................... G06F 9/455 345/522 |
| 2013/0148717 A1 | 6/2013 | Yitschak et al. |
| 2014/0223061 A1 | 8/2014 | Yap et al. |
| 2014/0237215 A1 | 8/2014 | Barry et al. |
| 2014/0372649 A1 | 12/2014 | Raffman et al. |
| 2015/0123977 A1 * | 5/2015 | Kanuri ...................... G06F 9/52 345/502 |

OTHER PUBLICATIONS

Elliott, G.A. ; Anderson, J.H., "Robust Real-Time Multiprocessor Interrupt Handling Motivated by GPUs", Jul. 11-13, 2012, pp. 267-276.

International Preliminary Report in Appl. No. PCT/US2016/036688 dated Feb. 6, 2018, 9 pages.

* cited by examiner

METHOD FOR CHAINING MEDIA PROCESSING

PRIORITY INFORMATION

This application claims priority to U.S. provisional patent application Ser. No. 14/816,508, entitled "METHOD FOR CHAINING MEDIA PROCESSING," filed Aug. 3, 2015, which is hereby incorporated by reference in its entirety as though fully and completely set forth herein.

BACKGROUND

Technical Field

Embodiments described herein are related to the field of integrated circuit implementation, and more particularly to the implementation of media processors.

Description of the Related Art

Computing systems may include a graphics or media processor for handling various tasks associated with processing media content, such as, for example, videos, games, or animated renderings. Some computing systems may include multiple media processors for performing media tasks with each processor performing a specific task or performing tasks for a portion of an image to be displayed. In such systems, a main application processor may be used to issue commands to each of the multiple media processors and to transfer data related to images from one media processor to another.

To manage multiple media processors, the main application processor may wait for one media processor to complete a first task associated with an image to be displayed. Then the main processor may transfer data from that media processor to another media processor along with a command to perform a next task associated with the image. The task of managing the media processors may cause the application processor to remain active at times when it could otherwise be placed into a reduced power mode, or the application processor may become less responsive due to latencies incurred while switching between managing media processors and managing other applications.

SUMMARY OF THE EMBODIMENTS

Various embodiments of a media processing system are disclosed. Broadly speaking, a system, an apparatus, and a method are contemplated in which the system includes a plurality of media units, a processor, and circuitry. Each media unit of the plurality of media units may be configured to execute one or more commands to process a display image. The processor may be configured to store a plurality of media processing commands in a queue. The circuitry may be configured to retrieve a first media processing command of the plurality of media processing commands from the queue, and send the first media processing command to a first media unit of the plurality of media units. The circuitry may be further configured to retrieve a second media processing command of the plurality of media processing commands from the queue, and send the second media processing command to a second media unit of the plurality of media units in response to receiving an interrupt from the first media unit. The circuitry may also be configured to copy data from the first media unit to the second media unit in response to receiving the interrupt from the first media unit.

In a further embodiment, the processor may be further configured to enter a reduced power state in response to storing the plurality of media processing commands to the queue. In another embodiment, the system may further comprise a direct memory access unit (DMA). To copy the data from the first media unit to the second media unit, the DMA may be configured to read the data from the first media unit and store the data in the second media unit.

In an embodiment, both the first media unit and the second media unit may include a graphics processing unit. In a further embodiment, the second media unit may include a display controller.

In another embodiment, the second media unit may include a media scaling processor. In one embodiment, the circuitry may be further configured to retrieve a third media processing command from the queue and send the third media processing command to a third media unit of the plurality of media units after the circuitry has retrieved the second media processing command from the queue and prior to sending the second media processing command to the second media unit.

BRIEF DESCRIPTION OF THE DRAWINGS

The following detailed description makes reference to the accompanying drawings, which are now briefly described.

Figure 1:
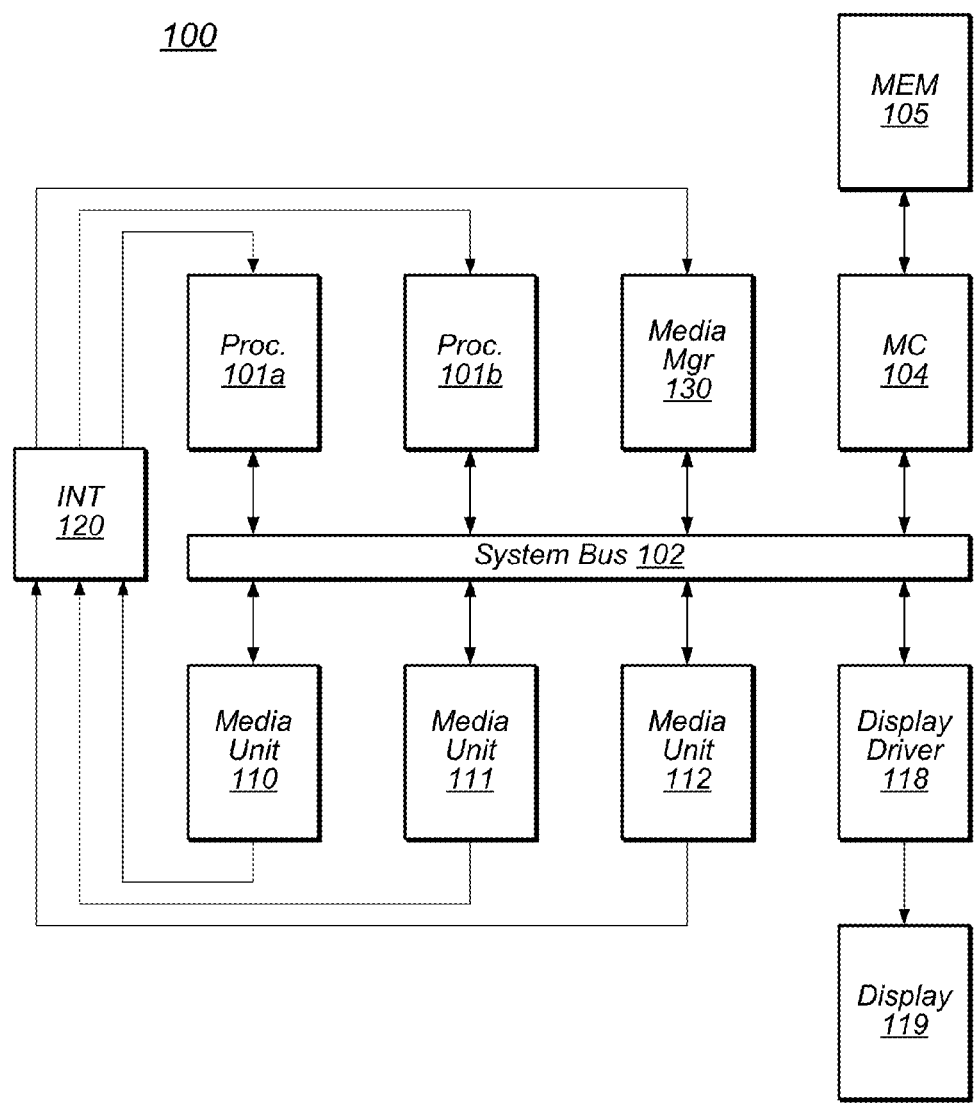
FIG. 1 illustrates a block diagram of an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

A computing system may include one or more circuits for performing tasks related to processing data related to displaying videos, playing games, or rendering other animated graphics to a display screen. Such computing systems may include desktop or laptop computers, tablets, smartphones or other types of devices. The one or more circuits may include, for example, graphics processors, video encoders/decoders, media scalar, and displays. These circuits are collectively referred to herein as "media agents."

To produce animated images on a display screen, a series of still images are displayed in sequence. Each still image may be referred to as a "frame" and may be produced and processed by one or more media agents. For example, a graphics processor may produce a frame based on read or received data. After the graphics processor has produced the frame, the frame may then be processed by a media scalar, an encoder, and a display. Some of the processing may occur in parallel while some processing may occur in series.

To control the flow of processing of the frame through various media agents, a main application processor may be used to issue commands to each of the media agents and transfer the frame from one agent to another, waiting for a first agent to finish in order to transfer the frame to second or third agents. Managing the media agents in such a manner may consume processing bandwidth from the application processor that could be used for other tasks, resulting in performance latencies that may make the system appear unresponsive to a user. In the absence of other tasks to perform, the processor might otherwise be placed into a reduced power mode to conserve battery power.

The embodiments illustrated in the drawings and described below may allow for more efficient use of a main application processor by reducing the processors involvement in media processing tasks. These embodiments may provide techniques that may allow for an method of managing various media agents while using less bandwidth from the main application processor.

A block diagram of an embodiment of computing system is illustrated in FIG. 1. In the illustrated embodiment, system 100 includes processors 101a-b coupled via system bus 102 to memory controller (MC) 104, media units 110-112, display driver 118, and media manager 130. Memory controller 104 is coupled to memory (MEM) 105 and display driver 118 is coupled to display 119. Interrupt controller 120 is coupled to media units 110-112 as well as to processors 101a-b. In various embodiments, system 100 may be implemented as multiple integrated circuits (ICs) coupled together on one or more circuit boards, as a system-on-a-chip (SoC) with all circuits integrated on single IC, or as a combination thereof.

Processors 101a-b may, in various embodiments, be representative of a general-purpose processors that performs computational operations. For example, processors 101a-b may be central processing units (CPUs) such as microprocessors, microcontrollers, application-specific integrated circuits (ASICs), or field-programmable gate arrays (FPGAs). Although two processors 101 are illustrated, some embodiments of system 100 may include a single processor 101 or may include more than two processors.

In various embodiments, processors 101 may implement any suitable instruction set architecture (ISA), such as, e.g., ARM™, PowerPC™, or x86 ISAs, or combination thereof. Processors 101a-b may implement the same ISA or each processor 101a-b may implement a different ISA. Processors 101 may include one or more bus transceiver units that allow processors 101 to communication to other functional blocks via system bus 102.

System bus 102 may be configured as one or more buses to facilitate the transfer of instructions and data between the various functional blocks within system 100. A subset of the various functional blocks, such as, for example, processors 101a-b and media manager 130 may be "bus masters," or, in other words, functional blocks that can initiate transfers across system bus 102. Other functional blocks may be limited to sending or receiving data via system bus 102 in response to a command from one of the bus masters.

Memory controller block 104, provides an interface to memory block 105. In addition to receiving commands for reading and writing data in memory 105, memory controller 104 may perform additional tasks such as, for example, mapping from virtual to physical addresses, data refreshing, and garbage collection. In addition, memory controller 104 may manage power modes of one or more memory arrays in memory block 105.

Memory block 105 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), Resistive Random Access Memory (RRAM or ReRAM), or a Magnetoresistive Random Access Memory (MRAM), for example. Some embodiments may include a single memory, as shown, and other embodiments may include more than one memory block (not shown). In some embodiments, memory block 105 may be configured to store program instructions that may be executed by processors 101a-b. Memory block 105 may, in other embodiments, be configured to store data to be processed, such as graphics data, for example.

Media units 110-112 may include various media agents that generate and/or process media information. In various embodiments, media units 110-112 may correspond to graphics processors, video encoders, video decoders, camera processors, color processing units, and media scaling and rotating processors. In some embodiments, media units 110-112 may each perform different functions, passing a frame from, for example, media unit 110 to media unit 111, and then from media unit 111 to media unit 112. A frame output from media unit 112 may be sent to display driver 118. In other embodiments, two or more of media units 110-112 may perform similar functions. For example, media units 110 and 111 may both be graphics processors with each media unit processing a portion of a given frame. The respective portions of the given frame output by media units 110 and 111 may be received by media unit 112 and/or display driver 118. Although three media units are illustrated, any suitable number of media units may be included in system 100.

Display driver 118 may include an interface for sending a frame to display 119. In some embodiments, display driver 118 may include memory for storing a currently displayed frame and may also include memory for queuing a next frame to be displayed. Display driver 118 may include circuits for processing the frame before the image data is sent to display 119, such as, for example, adjusting for brightness and contrast settings. Display 119 may consist of any suitable type of display such as, Liquid Crystal Diode (LCD), Organic Light Emitting Diode (OLED), Electrophoretic Display (EPD), or Interferometric Modulator Display (IMOD), for example. Display 119 may be included as part of system 100 or may be in a separate enclosure coupled to display driver 118 via a cable or a wireless interface. A touchscreen user interface (UI) may be included in display 119, in some embodiments.

Interrupt controller 120 receives signals from media units 110-112 and may assert one or more interrupt signals to processors 101*a-b* or media manager 130. In addition to receiving signals from media units 110-112, interrupt controller 120 may receive signals from various other functional blocks in system 100 (not shown). Each media unit 110-112 may, upon completing a current task or command, assert a signal to indicate the completion. Interrupt controller 120 may receive the asserted signal and, in response, assert a corresponding interrupt signal to one or more processors, including processors 101*a-b* and media manager 130. Interrupt controller 120 may include registers and circuits that allow a given input signal to be routed to a particular interrupt. For example, in the present embodiment, the signals from media units 110-112 are routed to an interrupt signal sent to media manager 130.

Media manager 130 may handle or assist in handling the creation of frames for display 119. As previously mentioned, a frame may pass through one or more media agents before being displayed on display 119. Movement of the frame may require a processor to read the frame from a first media agent and copy the frame to a next media agent. Media manager 130 receives an interrupt from one of media units 110-112, for example, media unit 110, corresponding to an asserted completion signal. In response to the interrupt, media manager 130 may copy a frame from memory in media unit 110 and store it in a next media unit, such as media unit 112 for a next processing step. Media manager 130 may retrieve commands and information related to the next processing step from a media queue. The media queue may, in various embodiments, consist of a portion of memory 105, be implemented as a buffer coupled to system bus 102, or may be memory implemented within media manager 130. Commands and information related to media processes may be stored in the media queue in response to software running on one or more of processors 101*a-b*. For example, processor 101*b* may execute instructions for a software program that includes displaying full-screen images. In response to executing the software, processor 101*b* stores media related commands in the media queue, allowing media manager 130 to handle the execution of the media related commands by one or more media agents.

It is noted that the system illustrated in FIG. 1 is merely an example. In other embodiments, different functional blocks and different configurations of functions blocks may be possible dependent upon the specific application for which the system is intended. For example, more than three media units and/or more than one display driver may be included in other embodiments.

Figure 2:
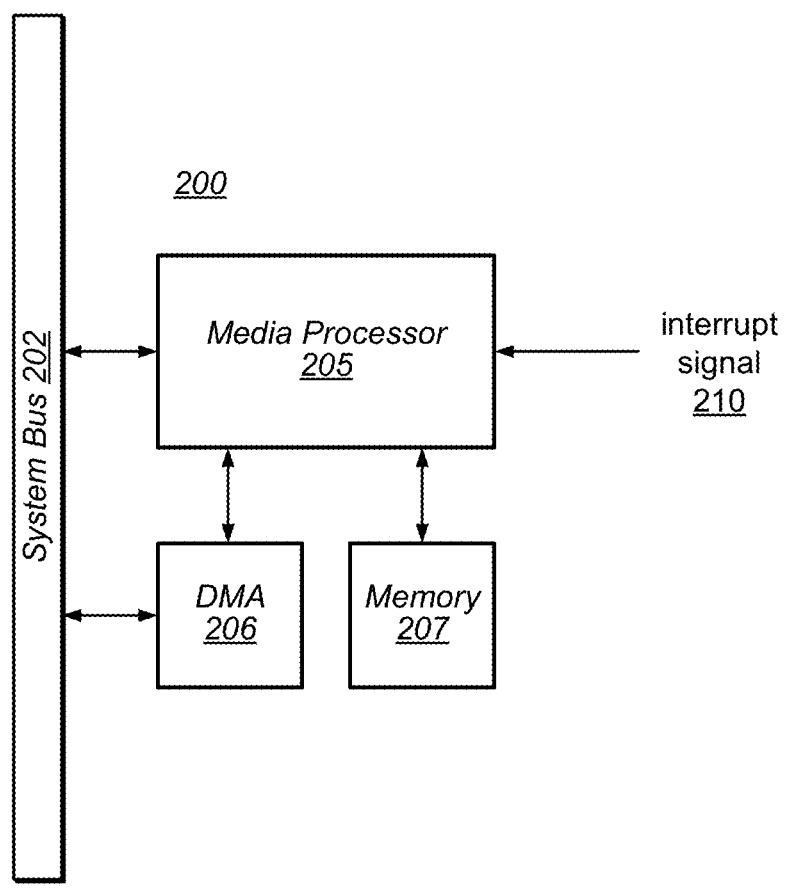
FIG. 2 illustrates a block diagram of a media management processor.

Turning to FIG. 2, an embodiment of a block diagram of a media manager is illustrated. In some embodiments, media manager 200 may correspond to media manager 130 in FIG. 1. In the illustrated embodiment, media manager 200 includes media processor 205, direct memory access (DMA) 206, and memory 207. Media processor 205 and DMA 206 are coupled to system bus 202. Media processor 205 receives interrupt signal 210.

Media processor 205 may correspond to a general purpose processing core, similar to processors 101*a-b* in FIG. 1, which performs computational operations. For example, media processor 205 may be a central processing unit (CPU), an application-specific integrated circuit (ASIC), or a field-programmable gate array (FPGA). In various embodiments, media processor 205 may implement any suitable instruction set architecture (ISA), such as, e.g., ARM™, PowerPC™, or x86 ISAs, or combination thereof.

In the present embodiment, DMA 206 is capable of transferring data from a source location to a destination location. The source and destination locations may be memory locations, such as, for example, memory 207 or memory block 105 in FIG. 1, or register locations within a functional block, such as, e.g., media units 110-112 or display driver 118 in FIG. 1. In some embodiments, DMA 206 may be capable of performing scatter-gather or gather-scatter memory transfers. Scatter-gather refers to a memory transfer in which the source addresses are varied (e.g., "scattered") and the destination is a single address (e.g., "gathered"). Gather-scatter, accordingly, is the opposite. Media processor 205 may program DMA 206 for one or more data transfers at a time.

Memory 207 includes a media command queue from which media processor 205 retrieves media commands. In some embodiments, memory 207 may be implemented as Random Access Memory (RAM) and may also include program instructions for the operation of media processor 205. In other embodiments, memory 207 may be a first-in, first-out (FIFO) buffer and may be reserved for use as the media command queue.

In the illustrated embodiment, media processor 205 performs operations to manage a flow of data related to media, such as, for example, frames to be displayed, as the data is sent to various media agents before being sent to a display. Media processor 205 retrieves a first command from a media queue in memory 207 and determines, from the first command, a target media agent to execute the command. Based on the first command, media processor 205 may setup DMA 206 to retrieve a first data set for a frame from another media agent or from a memory, such as memory 207 or memory block 105 in FIG. 1. DMA 206 copies the first data set to the target media agent. Media processor 205 sends the first command to the target media agent for execution. While the target media agent executes the first media command, media processor 205 retrieves a second command from the media command queue in memory 207. The second command may correspond to a second data set for a second media agent, in which case, media processor 205 sets DMA 206 to copy the second data set to the second media agent while the first command continues to be executed.

Conversely, the second command may correspond to a next step for the first data set being processed by the target media agent. In this second case, media processor 205 may wait until the target media agent completes the execution of the first command before initiating DMA 206 to transfer the first data set from the target media agent to another media agent. While waiting for the first media agent to complete the first command, media processor 205 may, in some embodiments, retrieve a third command from the media command queue, while in other embodiments, media processor 205, may enter a reduced power mode while waiting. When the target media agent completes the execution of the first command, interrupt signal 210 is asserted, via an interrupt controller, such as, e.g., interrupt controller 120 in FIG. 1. In response to the asserted interrupt signal 210, media processor 205 may begin processing the second command, including setting DMA 206 to transfer the first data set to the other media agent. In embodiments in which a third command has started, media processor 205 may pause processing of the third command to process the second command, or may instead complete the transfer of data related to the third command and send the third command to the respective media agent before processing the second command.

It is noted that the embodiment of media manager 200 as illustrated in FIG. 2 is merely an example. The illustration of FIG. 2 has been simplified to highlight features relevant to this disclosure. Various embodiments may include different configurations of the functional blocks, including additional blocks.

Figure 3:
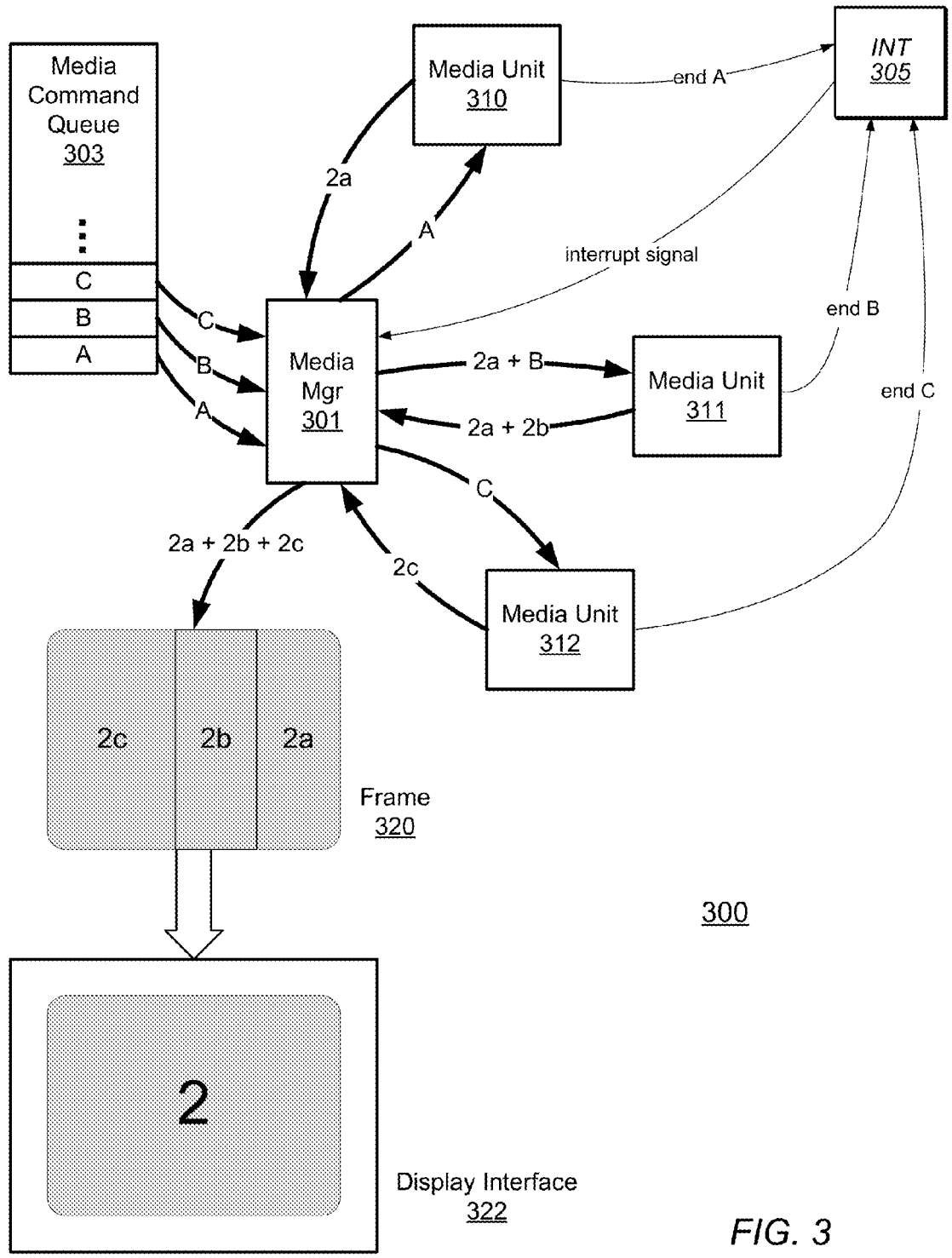
FIG. 3 shows a diagram representing a flow of data and commands through multiple media units.

Moving to FIG. 3, a diagram representing a flow of data and commands through multiple media units is presented. Diagram 300 illustrates an example of data flow from commands A, B, and C stored in media command queue 303 to the generation of frame 320. Diagram 300 includes media manager 301, media command queue 303, interrupt controller 305, media units 310-312, and display interface 322.

Commands A, B, and C are stored to media command queue 303 by a processor, such as processor 101*a* or 101*b* of system 100 in FIG. 1. In the present embodiment, commands A, B, and C correspond to a single frame (frame '2') to be displayed via display interface 322. When at least one command has been stored in queue 303, such as command A, for example, media manager 301 retrieves command A from queue 303, and determines from the command to which media unit 310-312 the command is targeted. Media manager 301 determines that command A is intended for media unit 310, and in response to the determination, sends the command to media unit 310. In some cases, media manager 301 may also retrieve a set of data associated with command A and send this data set to media unit 310, while in other cases, media unit 310 may already have access to the data set from, for example, a previously executed command. While media unit 310 is executing command A, media manager 301 retrieves command B from queue 303. Command B is intended for media unit 311, however, command B uses the output from command A. Media manager 301, therefore, waits for media unit 310 to complete command A before sending command B to media unit 311. In some embodiments, media manager 301 may wait for command B to be executed before retrieving command C. In the present embodiment, however, media manager 301 retrieves command C while media unit 310 continues to process command A.

Command C is targeted for media unit 312 and uses a different set of data than commands A and B. Command C, may, therefore, be processed in parallel with commands A and B. Media manager 301 sends command C to media unit 312, and, if required, sends an associated data set to media unit 312. While command C is being processed, media unit 310 may complete execution of command A, and have data set 2*a* prepared as an output. Media unit asserts an end of command A (end A) signal to interrupt controller 305. Interrupt controller 305 associates the end A signal from media unit 310 with media manager 301 and, therefore, asserts an interrupt signal coupled to media manager 301. In response to the interrupt signal, media manager 301 retrieves data set 2*a* from media unit 310 and transfers it to media unit 311 along with command B. While command B is processed by media unit 311, media unit 312 may complete execution of command C. In response to completing command C, media unit 312 asserts an end of command C (end C) signal to interrupt controller 305. Interrupt controller responds by asserting the interrupt signal again, alerting media manager 301. In some embodiments, media manager 301 may have multiple interrupt inputs for the media units in the system, which may allow media manager 301 to determine which media unit reached the end of a command based on which associated interrupt is asserted. In other embodiments, media manager may have one interrupt input for all media units and may need to determine which media unit has completed command processing, such as, for example, by polling each active media unit.

In the present embodiment, media manager 301 determines that media unit 312 has completed command C. Media manager 301, however, also determines that command B has to complete in order for a complete frame 320 to be generated. In some embodiments, media manager 301 may retrieve data set 2*c* from media unit 312 before command B is completed, while in other embodiments, media manager 301 may wait until command B is completed before retrieving data set 2*c*. When media unit 311 completes command B and asserts the end of command B (end B) signal to interrupt controller 305, media manager receives the corresponding interrupt signal and determines that processing for data sets 2*a*, 2*b*, and 2*c* are complete and transfers the data sets into frame 320 which is sent to display interface 322. In various embodiments, frame 320 may be sent to another functional block (e.g., a media scalar) in addition to or in place of display interface 322.

It is noted that while the execution of commands A, B, and C is taking place, main processors in the system, such as, for example, processors 101*a*-*b* in system 100 of FIG. 1, may be available for processing commands for other applications or an operating system. Processor 101*a* and or 101*b* may also enter low power modes while media manager 301 manages the data flow for the generation of frame 320.

It is also noted that the diagram of FIG. 3 merely illustrates examples of a flow of data that may result from an embodiment presented in this disclosure. Various other embodiments may include a different number of media units and commands, and may result in a different flow of data among the media units.

Figure 4:
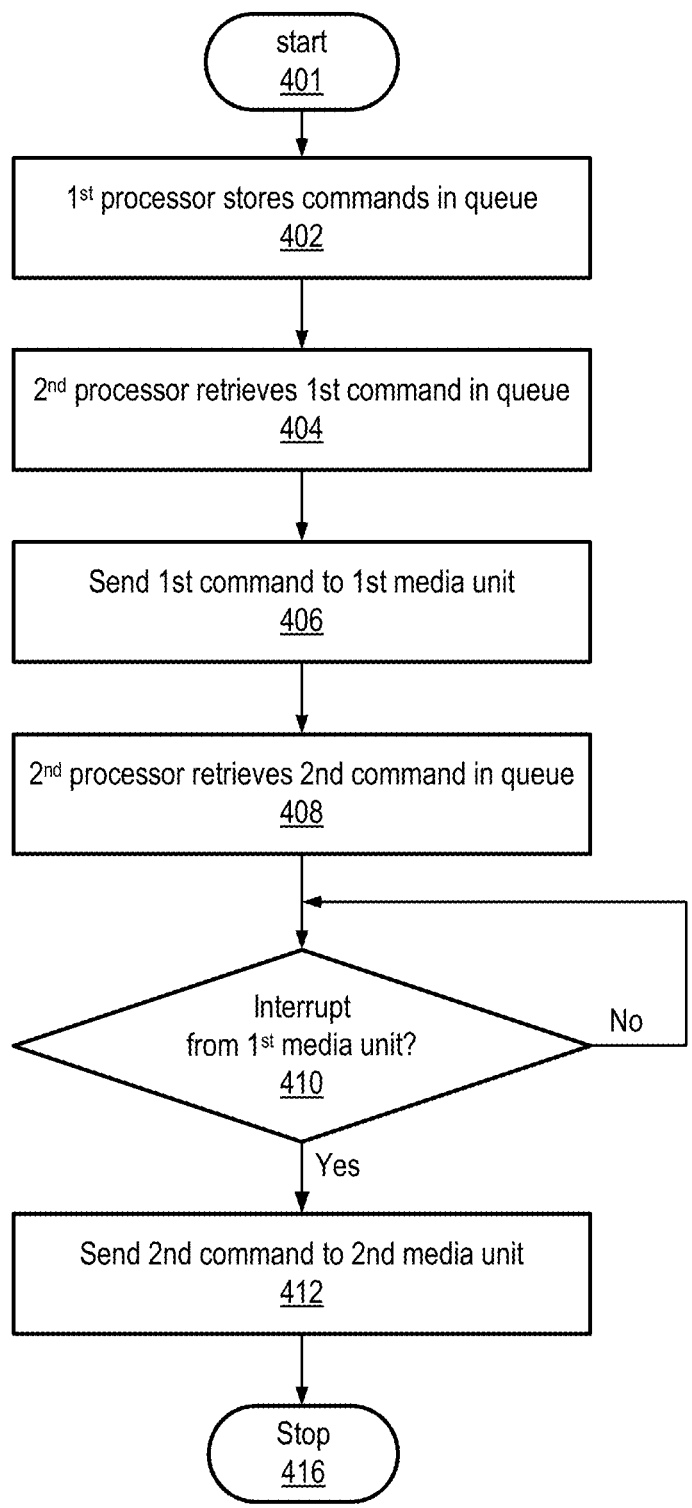
FIG. 4 illustrates a flow diagram illustrating an embodiment of a method for managing multiple media units.

Turning now to FIG. 4, a flow diagram illustrating an embodiment of a method for managing multiple media units is illustrated. The method may be applied to a media management processor, such as, for example, media manager 130 in FIG. 1. Referring collectively to system 100 and the flowchart in FIG. 4, the method may begin in block 401.

A first processor stores commands in a queue (block 402). Commands are stored into the queue by a first processor, such as, for example, processor 101*a* or 101*b*. In various embodiments, the queue may correspond to a circuit dedicated to storing commands, such as, for example, a FIFO buffer, or to a data structure maintained in a larger system memory, such as memory 105. The stored commands may, in some embodiments, include multiple commands for generating a single frame.

A second processor retrieves a first command from the queue (block 404). In the present embodiment, the second processor corresponds to a media management processor, such as, for example, media manager 130. Media manager 130 determines a target media agent for the first command, such as media unit 111, for example. Media manager 130 may also determine if data associated with the first command is to be copied to media unit 111.

Media manager 130 sends the first command to media unit 111 (block 406). Media unit 111 receives the first command and may receive data associated with the first command. The first command may result in a portion of processing of the data to generate a frame for a display. Additional processing of the output of media unit 111 from execution of the first command may occur before the data for the frame is complete.

Media manager 130 retrieves a second command from the queue (block 408). While media unit 111 processing the first command, media manager 130 retrieves the second command. Media manager 130 determines the target media agent for the second command, for example, media unit 112. Media manager 130 also determines that the second command is to be executed on the output from the first command executed by media unit 111.

Further operations of the method may depend on execution of the first command by media unit 111 (block 410). When media unit 111 completes the first command, it asserts a signal to indicate that the first command is complete. This command completion indication triggers an interrupt to media manager 130, via, for example, interrupt controller 120. If the interrupt has not been triggered, then the method remains in block 410. Media manager 130, may, in some embodiments, retrieve a third command while waiting for the interrupt to be triggered. If the interrupt has been triggered, then the method moves to block 412 to process the second command.

After the interrupt is asserted indicating media unit 111 has completed the first command, media manager 130 sends the second command to media unit 112 (block 412). In response to the interrupt from interrupt controller 120, media manager 130 sends the second command to media unit 112, as was previously determined to be the target media agent. In addition, media manager 130 copies output data from media unit 111 to media unit 112 for use in executing the second command. For example, media unit 111 may generate an initial frame or portion of a frame based on the first command. Media unit 112 may adjust colors, opacity, or scale of the initial frame dependent on the second command, and therefore, uses the output from media unit 111 to generate an adjusted frame. The adjusted frame may be sent, by media manager 130 to a display driver, to a file in a memory, to a third media agent, or to another suitable destination as determined by commands from the queue. The method may end in block 416.

It is noted that the method illustrated in FIG. 4 is merely an example embodiment. Variations on this method are possible. Some operations may be performed in a different sequence, and/or additional operations may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
  a plurality of media circuits, including a first media circuit and a second media circuit, each configured to operate on at least a portion of a frame of graphics data;
  an application processor configured to issue a plurality of media commands to a queue;
  a direct memory access circuit (DMA) configured to copy data between different storage locations based on current settings; and
  a media managing circuit configured to:
    retrieve a first media command of the plurality of media commands from the queue;
    set the DMA to copy data associated with the first media command from a particular storage location to the first media circuit;
    send the first media command to the first media circuit for execution;
    while the first media command is being executed by the first media circuit:
      retrieve a second media command of the plurality of media commands from the queue;
      determine that the second media command utilizes data that is dependent on a completion of the first media command; and
      set the DMA to copy data from the first media circuit to the second media circuit; and
    in response to an assertion of an interrupt by the first media circuit indicating that the first media circuit has completed the first media command, send the second media command to the second media circuit.

2. The system of claim 1, wherein to copy the data from the first media circuit to the second media circuit, the DMA is further configured to copy the data in response to the assertion of the interrupt.

3. The system of claim 1, wherein the application processor is further configured to:
  enter a reduced power state in response to issuing the plurality of media commands to the queue; and
  remain in the reduced power state after the assertion of the interrupt.

4. The system of claim 1, wherein, while the first media command is being executed by the first media circuit, the media managing circuit is further configured to:
  retrieve a third media command from the queue; and
  determine that the third media command utilizes data that is independent of the completion of the first media command.

5. The system of claim 4, wherein the media managing circuit is further configured to:
  set the DMA to copy data associated with the third media command from another storage location to a third media circuit of the plurality of media circuits; and
  send the third media command to the third media circuit.

6. The system of claim 5, wherein the media managing circuit is further configured to:
  in response to the assertion of the interrupt, determine that the third media command is being executed by the third media circuit;

cause the DMA to pause copying of the copy data associated with the third media command to the third media circuit; and initiate the DMA to copy data from the first media circuit to the second media circuit.

7. The system of claim 6, wherein the media managing circuit is further configured to, in response to a determination that the DMA has completed copying the data to the second media circuit, cause the DMA to resume copying of the copy data associated with the third media command from the another storage location to the third media circuit.

8. A method, comprising:
issuing, by an application processor, a plurality of media commands to a queue;
retrieving, by a media managing circuit, a first media command of the plurality of media commands from the queue;
setting, by the media managing circuit, a direct memory access circuit (DMA) to copy data associated with the first media command from a particular storage location to a first media circuit;
sending the first media command to a first media circuit for execution;
while the first media command is being executed by the first media circuit:
retrieving, by the media managing circuit, a second media command of the plurality of media commands from the queue;
determining, by the media managing circuit, that the second media command utilizes data that is dependent on a completion of the first media command; and
setting, by the media managing circuit, the DMA to copy data from the first media circuit to a second media circuit;
asserting, by the first media circuit, an interrupt indicating that execution of the first media command has completed; and
sending, by the media managing circuit, the second media command to the second media circuit.

9. The method of claim 8, wherein copying the data from the first media circuit to the second media circuit comprises copying, by the DMA, the data in response to the assertion of the interrupt.

10. The method of claim 8, further comprising:
entering, by the application processor, a reduced power state in response to issuing the plurality of media commands to the queue; and
remaining in the reduced power state after the assertion of the interrupt.

11. The method of claim 8, further comprising:
while the first media command is being executed by the first media circuit:
retrieving, by the media managing circuit, a third media command from the queue; and
determining, by the media managing circuit, that the third media command utilizes data that is independent of the completion of the first media command.

12. The method of claim 11, further comprising:
setting, by the media managing circuit, the DMA to copy data associated with the third media command from another storage location to a third media circuit; and
sending, by the media managing circuit, the third media command to the third media circuit.

13. The method of claim 12, further comprising:
in response to the assertion of the interrupt, determining, by the media managing circuit, that the third media command is being executed by the third media circuit;
causing, by the media managing circuit, the DMA to pause copying of the data associated with the third media command to the third media circuit; and
setting, by the media managing circuit, the DMA to copy data from the first media circuit to the second media circuit.

14. The method of claim 13, further comprising, in response to determining that the DMA has completed copying the data to the second media circuit, causing, by the media managing circuit, the DMA to resume copying of the copy data associated with the third media command from the another storage location to the third media circuit.

15. An apparatus, comprising:
a memory;
a direct memory access circuit (DMA) configured to copy data between different storage locations based on current settings; and
a media processor configured to:
retrieve a first media command of a plurality of media commands stored, by a host processor, in a queue in the memory;
set the DMA to copy data associated with the first media command from a particular storage location to a first media circuit;
send the first media command to the first media circuit for execution;
while the first media command is being executed by the first media circuit:
retrieve a second media command of the plurality of media commands from the queue;
determine that the second media command utilizes data that is dependent on a completion of the first media command; and
set the DMA to copy data from the first media circuit to a second media circuit; and
in response to an assertion of an interrupt by the first media circuit indicating that the first media circuit has completed the first media command, send the second media command to the second media circuit.

16. The apparatus of claim 15, wherein to copy the data from the first media circuit to the second media circuit, the DMA is further configured to copy the data in response to the assertion of the interrupt.

17. The apparatus of claim 15, wherein, while the first media command is being executed by the first media circuit, the media processor is further configured to:
retrieve a third media command from the queue; and
determine that the third media command utilizes data that is independent of the completion of the first media command.

18. The apparatus of claim 17, wherein the media processor is further configured to:
set the DMA to copy data associated with the third media command from another storage location to a third media circuit; and
send the third media command to the third media circuit.

19. The apparatus of claim 18, wherein the media processor is further configured to:
in response to the assertion of the interrupt, determine that the third media command is being executed by the third media circuit;
cause the DMA to pause copying of the copy data associated with the third media command to the third media circuit; and initiate the DMA to copy data from the first media circuit to the second media circuit.

20. The apparatus of claim 19, wherein the media processor is further configured to, in response to a determination that the DMA has completed copying the data to the second media circuit, cause the DMA to resume copying of the copy data associated with the third media command from the another storage location to the third media circuit.

* * * * *